Feb. 4, 1936.  G. O. JONES  2,029,661

TRANSMISSION

Filed July 14, 1933   6 Sheets-Sheet 1

Inventor
GEORGE O. JONES

By Semmes & Semmes

Feb. 4, 1936.  G. O. JONES  2,029,661
TRANSMISSION
Filed July 14, 1933  6 Sheets-Sheet 2

Inventor
GEORGE O. JONES
By Semmes & Semmes
Attorneys

Feb. 4, 1936.  G. O. JONES  2,029,661
TRANSMISSION
Filed July 14, 1933   6 Sheets-Sheet 3

Inventor
GEORGE O. JONES
By Semmes & Semmes
Attorneys

Feb. 4, 1936. G. O. JONES 2,029,661
TRANSMISSION
Filed July 14, 1933 6 Sheets-Sheet 6

Inventor
GEORGE O. JONES
By Semmes & Semmes
Attorneys

Patented Feb. 4, 1936

2,029,661

UNITED STATES PATENT OFFICE 2,029,661

TRANSMISSION

George O. Jones, Ludowici, Ga.

Application July 14, 1933, Serial No. 680,451

19 Claims. (Cl. 74—336.5)

My invention relates to a speed changing mechanism and is particularly designed for changing the speed of a driven shaft with respect to a driving shaft.

It is of particular utility in automotive constructions, but is applicable elsewhere. The variation in speed between the drive and driven shaft may be automatically controlled or manually controlled.

In the usual gear shifting mechanisms wherein the drive is shifted to gears of different ratios to vary the speed between the drive and driven shafts, there are inherent disadvantages.

Among those disadvantages are danger of stripping the gears, deterioration of parts, and quite important, the necessary factor of the skill of the operator. This last is of moment since even with the best made gears, if the clutch is shifted at the wrong time, or the relative speeds of the gears are not proper, injury can occur to the mechanism.

One of the objects of my invention is to provide a speed change device which is neat and compact, light in weight with few operating parts, and in which repair and replacement are easily effected.

Another object is to permit of the use of high speed high compression engines without the difficulty in shifting of gears, and to provide a simple compact mechanism which will give for use with such engines a relatively large number of speed changes between drive and driven shafts.

A further object of my invention is to provide such a device which may be either automatically or manually controlled.

A further object is to provide a clutch mechanism which is neat, compact and efficient, in which the parts are totally encased to prevent injury or inefficiency through dirt, oil or grease.

A further object of my invention is to provide a dash control mechanism which will permit the device, when set for automatic operation, to be controlled as to its variable factors and which will also permit at least a part, or the whole of the operation, to be shifted from the automatic to manual operation.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which, for the purpose of explanation, have been made the subject of illustration.

Figure 1:
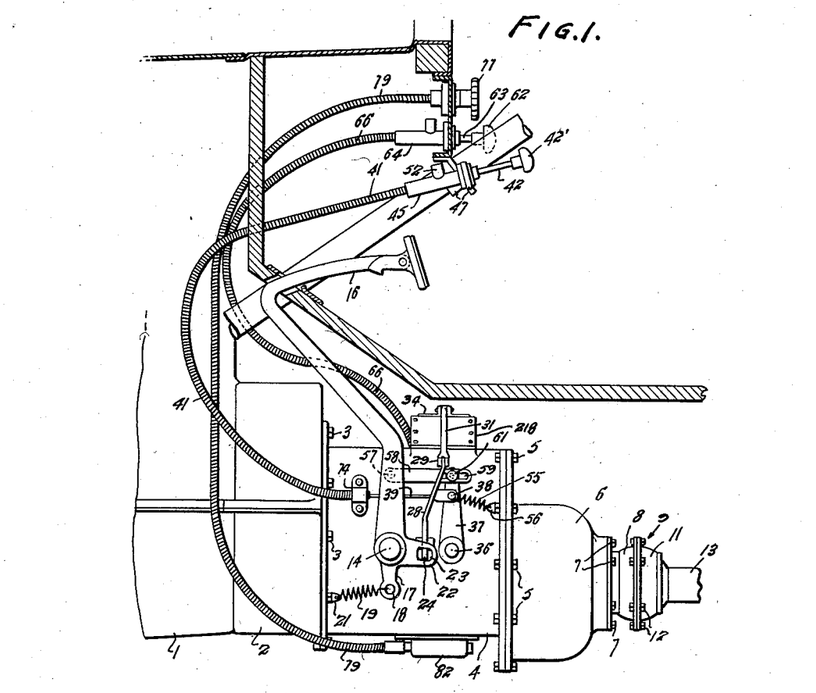
Figure 1 is a side elevation of my transmission with the control devices shown operable from the driver's seat of the car.
Figure 2:
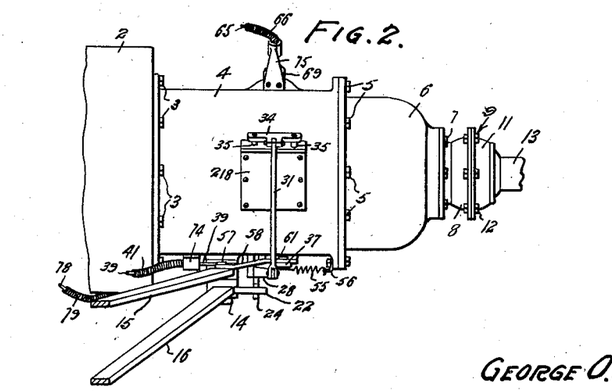
Fig. 2 is a top plan view of my device, part of the controls being broken away.

Referring to the drawings, and with particular reference to Figures 1 and 2, I have shown a motor 1 having a flywheel casing 2. Bolted by bolts 3 to the flywheel casing 2 is a variable speed transmission casing 4.

The variable speed transmission casing 4 is bolted by bolts 5 to a governor casing 6. The governor casing 6 is bolted by means of bolts 7 to a forward half 8 of universal connection casing 9, whose latter half 11 is connected by bolts 12 to the forward half 8. The rear half 11 of the universal housing 9 has a tubular extension 13 in which a rear section of a propeller shaft is housed.

There are pivoted to a stub shaft 14 on the side of the transmission casing 4 a brake pedal 15 and a clutch pedal 16. The clutch pedal is provided with a downwardly extending section 17 provided with a loop 18 into which fits one end of a spring 19, whose other end is supported at 21 either on the flywheel housing 2 or on the transmission housing 4.

The clutch pedal is provided with a substantially horizontally extending arm 22 provided with an aperture 23. In the aperture 23 is adapted to fit a short arm 24 (see Figure 6) of a bell crank lever 25 which is pivoted at 26 on a pivot member that is supported on a support 27. The support 27 may be attached to or integrally formed with the transmission housing 4. The bell crank lever 25 is provided with a long arm 28 to whose upper end at 29 is pivoted a control link 31, whose other end is pivoted at 32 to upstanding supports 33 (see Figure 8) on a bar 34. Attached to the bar 34 are bolts 35 which are adapted to be reciprocated by movement of the clutch pedal through the train of mechanism just described. The clutch pedal when depressed against the tension of the spring 19 will move the arm 22 upwardly, which moves upwardly the arm 24 of the bell crank lever 25; this in turn causes the arm 28 of the bell crank 25 to exert a push on the link 31, which will move the bar 34 to cause the bolts 35 to be moved upwardly further from the interior of the transmission casing 4.

This clutch pedal 16 is pushed downwardly against the tension spring 19, which tends to return the parts to their original position. The outward movement of the bolts 35, as will be later explained, releases all of the automatic control mechanism and permits the vehicle to coast or permits of the operation of the low gear or reverse gear in accordance with control mechanism later to be described.

Figure 3:
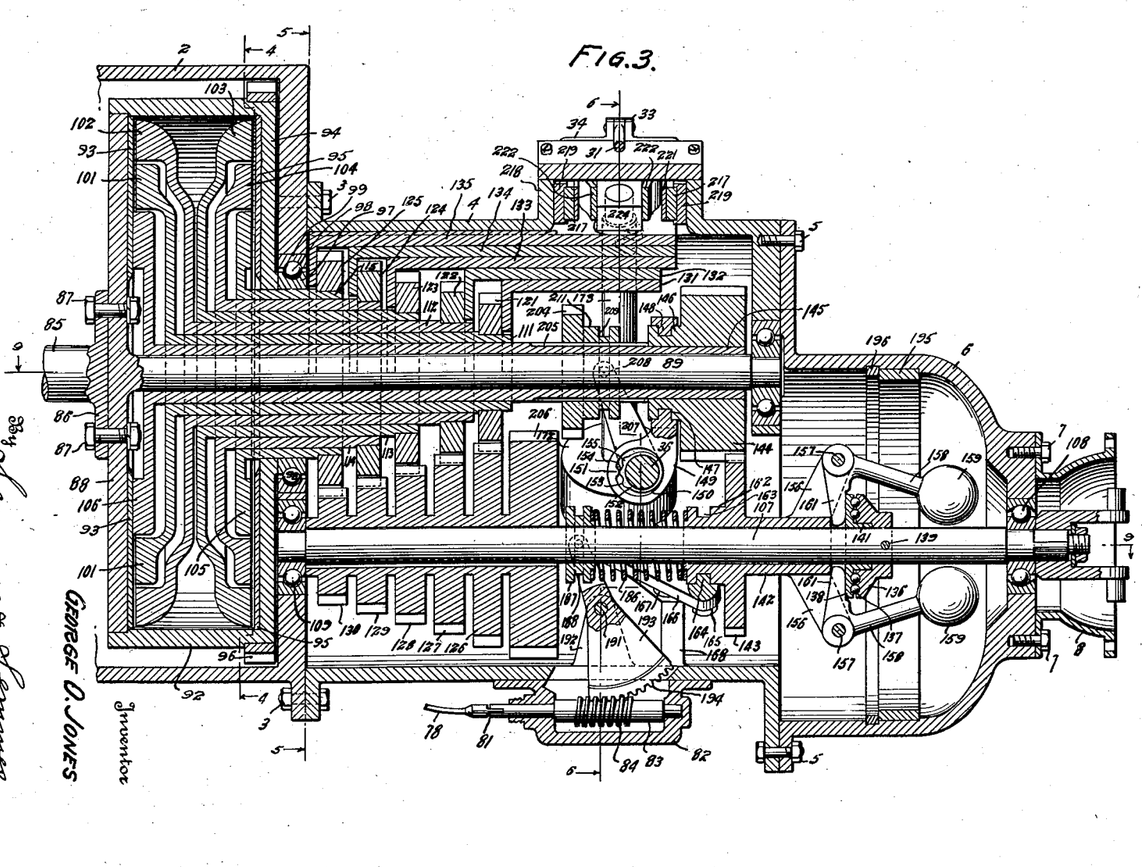
Fig. 3 is a view in longitudinal vertical section taken through the axis of rotation of the drive and propeller shafts.
Figure 4:
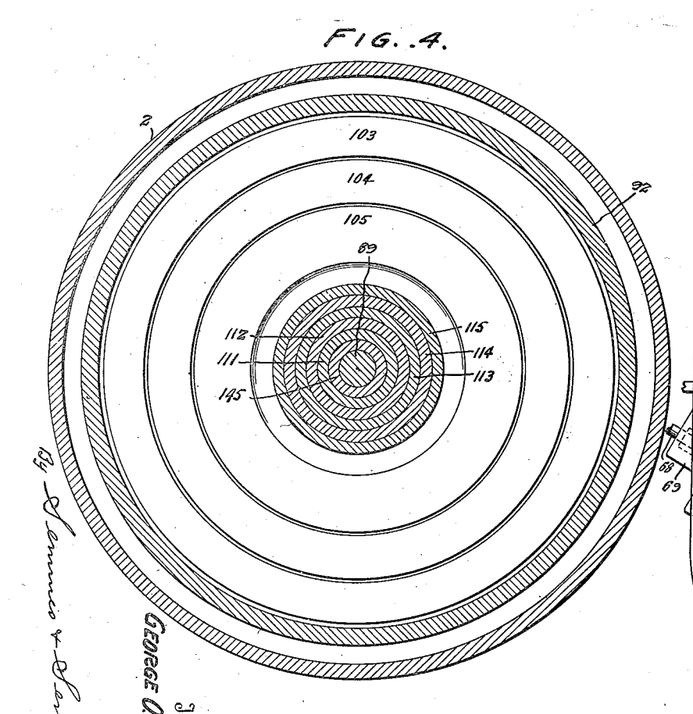
Fig. 4 is a sectional view taken on the line 4—4 of Figure 3, looking in the direction of the arrows.

From an inspection of Figures 1 and 3 it will be noted that there is a shaft 36 which extends exteriorly of the transmission casing 4. This shaft 36 extends into the interior of the casing 4 and controls the reverse and sub low gearing and also aids in the automatic operation. The shaft 36 is splined to an operating lever 37 to which is pivoted at 38 one end of a Bowden wire construction 39 which extends through a Bowden wire casing 41 and thence to a road 42 that is controlled by a button 42' mounted on the dash.

Figures 10, 11, 12, 13, 14:
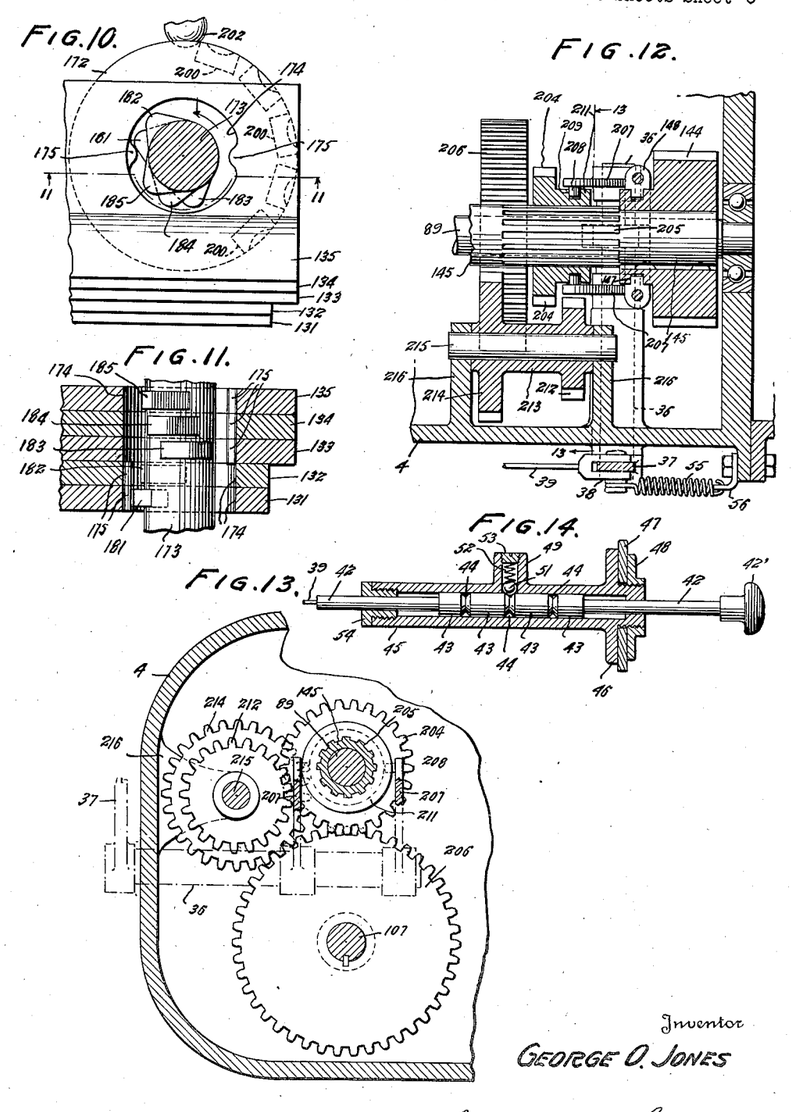
Fig. 10 is a detailed view taken along the line 10—10 of Figure 6, looking in the direction of the arrows.
Fig. 11 is a detailed sectional view taken along line 11—11 of Figure 10, looking in the direction of the arrows.
Fig. 12 is a detailed view, partly in section, showing the reverse idler gears.
Fig. 13 is a sectional view taken along the line 13—13 of Figure 12, looking in the direction of the arrows.
Fig. 14 is a detailed sectional view showing the detent mechanism for the reverse and sub low button.

The mechanism for the button 42' is shown in detail in Figure 14. The rod 42 is provided with plunger members 43 having annular grooves or depressions 44 between them. The rod 42 is journalled at one end in a casing 45 provided with an annular flange 46 which is adapted to fit against the sheet metal 47 of the dashboard of the vehicle, or some other suitable mounting. A flanged clamping nut 48 holds the casing member 45 in place on the dash when screw-threaded into position, as indicated in Figure 14. The casing 45 is provided with an upstanding tubular member 49 in which is adapted to travel a ball 51. The ball 51 is pressed by spring 52 against the surface of the members 43. A nut 53 holds the spring 52 in tension against the ball 51. The rod 42 is journalled into a screw threaded cap 54 which is screw-threaded into an aperture provided in the supporting casing 45. As before stated, the rod 42 is attached to the Bowden wire 39.

The mechanism just described provides for the button 42' to be yieldingly held in any one of three positions. The button 42' can be pushed into the dashboard to its fullest extent, at which time the ball 51 will rest in an annular aperture 44 at the right and yieldingly hold the rod 42 in this position. Or the rod 42 may occupy the position shown in Figure 14, in which case the button 42' holds it in the position indicated. Likewise the rod 42 may be pulled further outwardly from the dash, in which case the ball 51 will rest in the aperture 44 at the left of the drawing, Figure 14.

Attached to pivot 38 on arm 37 is a spring 55 whose other end is attached to a support 56 which may be on the flange of the transmission housing 4. This spring 56 tends to pull on the wire 39, and hence on the rod 42, until at least one of the grooves 44 engages with the ball 51. The spring thus insures that the rod 42 will occupy such position that the ball 51 will rest in one of the annular grooves 44 formed on the enlarged sections 43 of the rod 42. This means that the shaft 36 will normally occupy any one of three positions, depending upon the manipulation of the operator. The three positions of the shaft will determine (1) that the automatic gear shift is in operation, or (2) that the sub low gearing is in operation, or (3) that the reverse gearing is in operation. The details of this construction and operation will be later described.

The brake pedal 15 has pivoted at 57 a link 58 provided with a lost motion slot 59 which is adapted to engage a lug 61 that is carried by the arm 37. This lost motion linkage is so arranged that when the vehicle is being driven through the automatic transmission mechanism, application of the brake will move the shaft 36 sufficiently to declutch the governor. This will be later described.

There is also shown in Figure 1 a control button 62 mounted on the dash. The construction is similar to that for the control button 42' previously described. The control button 62 is mounted on a rod 63 similar to rod 42 for control button 42'. The rod 63 travels through a casing 64, similar to the casing 45, in which is adapted to reciprocate rod 42. The casing 64 has a yielding stop mechanism similar to that in the casing 45, with the exception that there is but one annular groove on the enlarged section of the rod 63 (not shown). This groove is adapted to hold the control button 62 in outward position. The rod 63 is attached to Bowden wire 65 (see Figure 6) which travels in a sheath 66. The Bowden wire 65 is attached through a nut 67 to a plunger 68 which operates within an aperture in a portion 69 of the casing 4. The plunger 68 is provided with a head 71. Above the head 71 is a compression spring 72 which lies within an aperture 73 formed in the portion 69 of the casing 4. The compression spring 72 tends to press the head 71 in the downward position.

Figures 6, 7, 8:
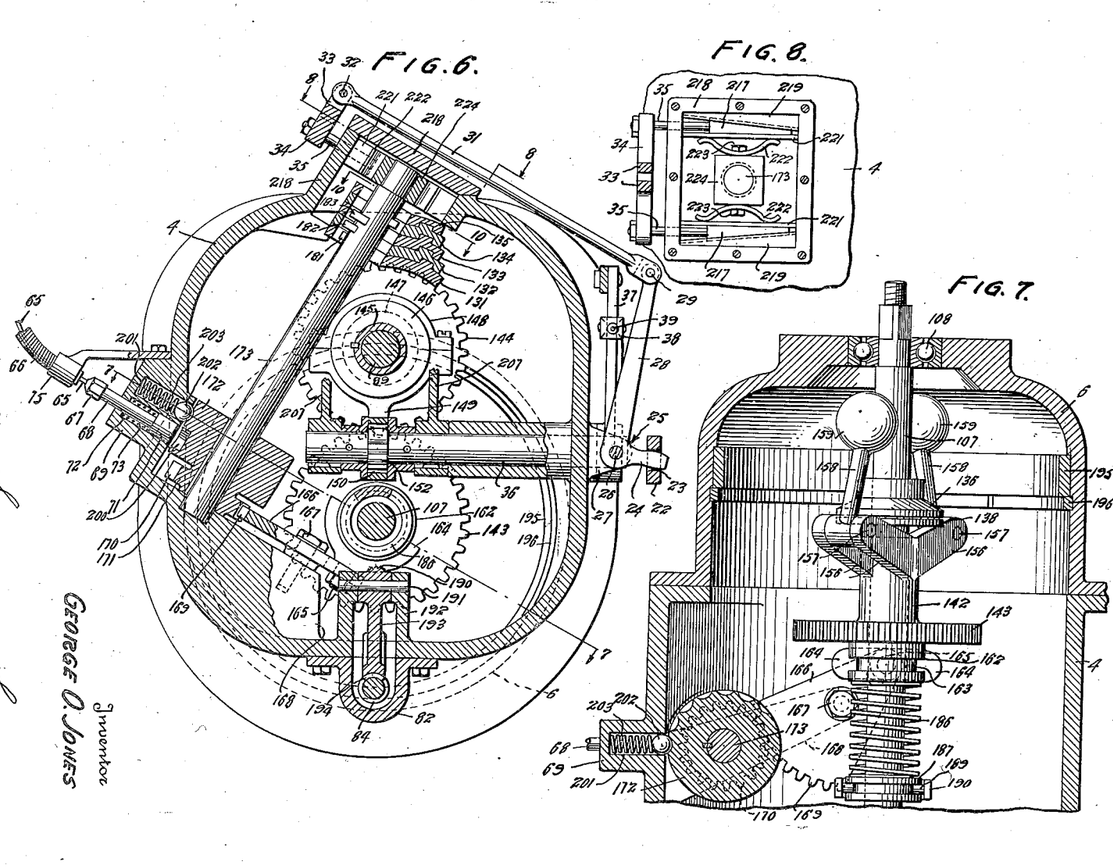
Fig. 6 is a sectional view taken on the line 6—6 of Figure 3, looking in the direction of the arrows.
Fig. 7 is a sectional view along the line 7—7 of Figure 6, looking in the direction of the arrows.
Fig. 8 is a detailed sectional view taken along the line 8—8 of Figure 6, looking in the direction of the arrows.

In Figure 6 I have shown the plunger 68 in the raised position, into which position it is moved by reason of a pull of the operator on Bowden wire 65 through the handle 62. The device may be held in the position shown in Figure 6 by the yielding holding means in the casing 64, which, as has been stated, is similar to the means already described in detail in connection with the casing 45. On pushing on the button 62 the rod 63 is pushed inwardly, which pushes on the Bowden rod 65 and disengages the yielding holding means in casing 64, thus permitting the spring 72 to push the plunger 68 into a downward position which will hold the vehicle in any selected gear, as will be later more fully described.

The casing 41 for the Bowden wire 39 is suitably mounted as indicated at 74 on the transmission casing 4. The casing 66 for the Bowden wire 65 has its lower end supported on a support 75 which is suitably mounted on the transmission casing 4.

Mounted on the dash is a hand wheel 77 which is adapted to operate a Bowden wire 78 (see Figure 3) which travels in a sheath 79. The Bowden wire 78 at its lower end is splined to a shaft 81 which is mounted in a support member 82 (see Figure 3), which is suitably attached at the base of the casing 4. The shaft 81 has an enlarged portion 83 which carries a worm 84. This worm 84 when rotated through turning the hand wheel 77 will control the setting of the governor mechanism, i. e. the tension of the governor spring, so that the automatic shift from one gear ratio to another can be determined by the operator of the car to a large extent at will and in view of the exigencies of the situation. The details of this will be later described.

The construction which permits of the automatic shifting of gears will now be described. The motor, which is mounted in the casing 1, has a crank shaft 85 which is provided with a flange 86 to which is bolted, by means of bolts 87, a plate 88 which forms part of the flywheel. A drive shaft 89 may be integrally formed with the plate 88. This construction is very sturdy and causes the drive shaft 89 to be practically a continuation of the crank shaft 85.

The annular plate 88 is attached to a circumferential annular member 92 which forms the periphery of the flywheel. Mounted on the inner face of the plate 88 is a clutch facing of some proper material 93. On the other side of the flywheel opposite the plate 88 is another plate 94 which is also provided with a clutch facing 95. The annular peripheral member 92 and the plate 94 may be integrally formed.

The annular peripheral member 92 carries starting gear teeth for operation by a starting motor (not shown), as indicated at 96. The plate 94 is provided with an extension 97 which may be suitably attached to the plate 94, or integrally formed therewith, which carries an interior ball race. Adapted to run in the ball race are balls 98. An exterior ball race 99 that is carried by the flywheel casing 2 permits the flywheel to rotate on balls 98, thus forming anti-friction bearings for the flywheel.

Mounted within the interior of the flywheel are two sets of nested clutches. A low gear clutch 101 is nested within the next highest gear clutch 102. The next nested set of clutches comprises a clutch 103 which gives a little higher gear ratio to the propeller shaft than clutch 102; a clutch 104 of the next higher gear ratio, and a clutch 105 of the next higher gear ratio. This last is the high gear clutch. Nested inside of clutch 101 is a clutch 106 which is the clutch that controls the operation of the governor, as well as the sub low gear, and the reverse gear, as will be later described. Any desired number of clutches and hence gear ratios made be used within the limits of mechanical design.

Figure 9:
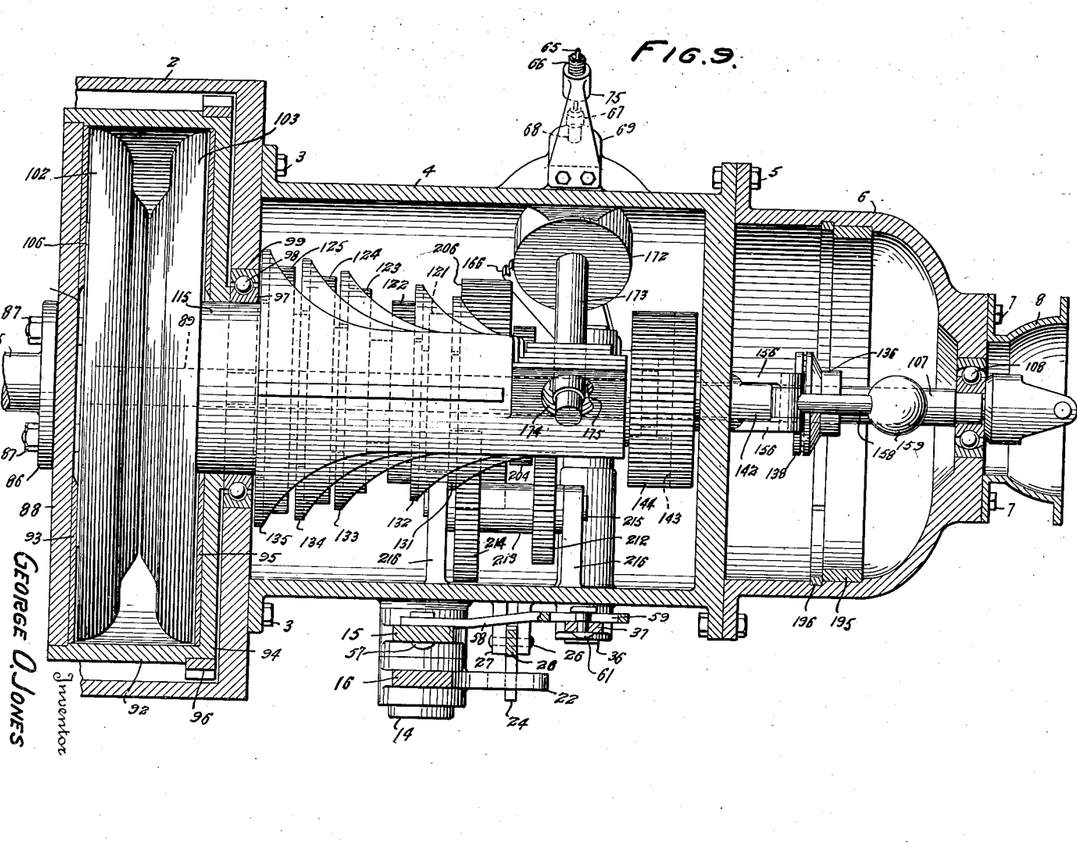
Fig. 9 is a view, partly sectional and partly in top plan, of the details of the mechanism taken generally along the line 9—9 (see Figure 3) looking in the direction of the arrows.

Adapted to be driven by the drive shaft 89 is a propeller shaft 107. Propeller shaft 107 is journalled on a thrust bearing construction 108, as indicated in Figure 3, 7, and 9. The bearing construction 108 is within the governor housing 6. At its other end the shaft 107 is journalled in a ball bearing support construction 109 (see Figure 3 particularly), which is carried by the wall of the flywheel casing 2.

Clutch members 101, 102, 103, 104, and 105 are adapted to be carried on nested hollow shafts 111, 112, 113, 114, and 115, respectively. Shafts 111, 112, 113, 114, and 115 carry gears 121, 122, 123, 124, and 125, respectively.

These gears 121, 122, 123, 124, and 125 constantly mesh respectively with gears 126, 127, 128, 129, and 130, which are keyed to the propeller shaft 107.

Each of the hollow shafts 111 to 115, inclusive, is adapted for reciprocating movement in the direction of length of the drive shaft 89 so that the various clutch members 101 to 105, inclusive, may be thrown into engagement with the adjacent clutch facings on the interior of the plates 88 and 94 of the flywheel. The clutch members 101 to 105, inclusive, are so made that between the part of the clutch that engages clutch faces on the interior of the plates of the flywheel and the hollow shafts that support the clutch members, there is sufficient spring in the metal of the clutch members to permit proper engagement to properly carry the load and yet provide sufficient spring to prevent undue strain on the parts.

With the parts in the position shown in Figure 3, only clutch 106, which is the one that controls the governor, sub low and the reverse gear is in clutching engagement within the flywheel, and the other clutches are shown spaced from the clutch faces 93 and 95 on the interior of the flywheel. These clutches may be moved, however, into clutching engagement by being reciprocated. Clutches 101 to 102 are reciprocated to the left as the parts are shown in Figure 3 to engage clutch facing 93. Clutches 103, 104, and 105 are shifted to the right to engage clutch face 95.

To move the clutches I have shown clutch finger mechanisms. These clutch finger mechanisms are adapted to bear against gears 121, 122, 123, 124, and 125 to press against the gears to shift the hollow shafts and hence the clutch members. Bearing against gears 121 and 122 are clutch fingers 131 and 132. These clutch fingers are adapted to travel towards the left with the parts as shown in Figure 3, and to press the respective clutch members 101 and 102 against the clutch face 93 on the interior of the flywheel. It is to be understood that only one clutch is selected at any one time by the automatic mechanism and that the other clutches are not in clutching relationship to the interior of the flywheel. Clutching fingers 133, 134, and 135 are adapted to bear against gears 123, 124, and 125 to move the hollow shafts on which these gears are mounted to the right, with the parts in the position shown in Figure 3, to bring the clutch faces 103, 104, and 105, respectively, into engagement with the clutch face 95 on the interior of the flywheel. As above noted the automatic mechanism will select only one finger to move a selected clutch member into engagement with the clutch face.

Figure 5:
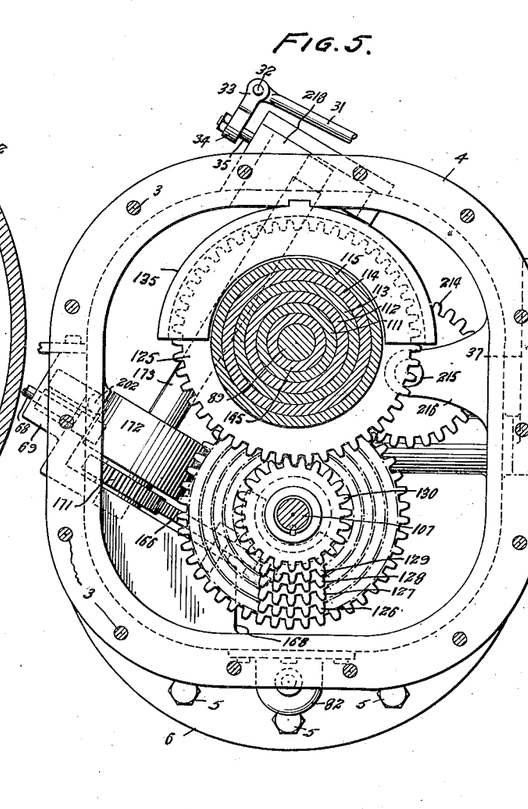
Fig. 5 is a sectional view on the line 5—5 of Figure 3, looking in the direction of the arrows.

The clutch fingers are keyed into each other as indicated in Figure 6, and the top clutch finger 135 is keyed into the interior of the transmission housing 4, as is indicated in Figures 9 and 5.

This construction keeps the clutch fingers in the proper position.

It is apparent that by proper control of the movement of the clutch fingers any of the clutch members 101 to 105 inclusive may be engaged with the clutch faces on the interior of the flywheel, and hence any of the five gear ratios may be selected to operate the propeller shaft from the drive shaft. It is of particular advantage that these gears are always in mesh, and that it is unnecessary to shift the gears in the ordinary sense to accomplish the desired change.

The mechanism for moving the clutch fingers to clutch a selected clutch member with a clutch face is accomplished through a cam mechanism which is controlled by a governor. The speed of rotation of the crank shaft, and hence the drive shaft, determines the position of the governor. At slow speeds for the drive shaft, the gear ratio will be low between the drive shaft and the propeller shaft. When the drive shaft is rotating at high speed the gear ratio between the drive shaft and propeller shaft will be high. This will permit of considerable economies in operation since any practical number of gear ratios can be incorporated in a device of this type. Five gear ratios only are shown, but more could be illustrated and used practically. When the engine is running at high speed the gear ratio may be made very high between the drive shaft and the propeller shaft, and this overdrive will effect important economies in oil and gasoline.

The governor and cam mechanism for controlling the movement of the clutch fingers and hence construction of the gear ratios is simple and will now be described, (see particularly Figure 3).

Mounted on the propeller shaft 107 is a thrust bearing member 136 provided with ball races in which are adapted to travel balls 137 which are held in ball races provided in another thrust bearing member 138. Thrust bearing member 136 is keyed, as indicated at 139, to the propeller shaft 107, but the member 138 is adapted to rotate freely on shaft 107, and is provided with a collar 141 which fits into an annular aperture formed in the member 136. Slidably mounted on the propeller shaft 107 is a collar 142 which carries a pinion 143 that is adapted to mesh with a broad pinion 144 which is keyed to a hollow shaft 145. The hollow shaft 145 carries at its other end the clutch member 106 which controls the governor, the sub-low and the reverse mechanisms, as will be described.

The broad pinion 144 is provided with a collar 146 which has therein an annular groove 147 into which fits a ring member 148 that is provided with an attachment 149 which has an annular aperture 150 therein provided with a teat 151. The shaft 36, which has been before referred to, and the exterior end of which is shown in Figure 1, is provided with an annular member 152 which has three teats on it; a teat 153, which can be called the reverse teat; teat 154, which can be called the governor teat; and a teat 155, which can be called the sub low teat.

With the parts in the position shown in Figure 3, the shaft 36 has been rotated so that the governor teat lies directly opposite and in contact with teat 151 of member 149. With the parts in the position shown the gear 144, and hence shaft 145, has been moved to the left so that the clutch member 106 is in clutching engagement with clutch face 83 on the interior of the flywheel. This causes the hollow shaft 145 to rotate with the flywheel, as also does the gear 144. The gear 144 is in meshing engagement with the pinion 143 which causes that pinion to rotate.

Mounted on the collar 142 are support members 156 at whose extremities are pivoted at 157 ball supporting arms 158 carrying governor balls 159. The ball supporting arms 158 may have integrally formed with them lever fingers 161. When the balls have been speeded up they will move outwardly, causing lever finger 161 to press on the thrust bearing member 138 to shove the collar 142, and hence gear 143, to the left, with the parts shown in the position in Figure 3.

There is a collar-like extension 162 carrying an annular groove 163 in which bear clutch fingers 164. Clutch fingers 164 are attached to a member which is pivoted at 165 to a cam shaft operating segment 166, (see Figure 7). The cam shaft operating segment 166 is pivoted at 167 to a support 168 formed in the interior of the transmission casing, (see Figure 3). The cam shaft operating segment is provided with teeth 169 which are adapted to mesh with teeth 170 of pinion 171, (see Figure 6) which may be integrally formed with an annular locking member 172. The pinion 171 and the locking member 172 are keyed to a cam shaft 173 which carries a series of cams at its other end for operating the clutch shift fingers 135, 134, 133, 132, and 131. The construction is readily apparent from an inspection of Figures 10, 11, and 6. Each clutch finger mechanism is provided with an aperture 174 through which extends cam shaft 173. In each aperture 174 is a teat 175. In Figure 10 the teat on the cam operating finger 135 can be seen. The teats on operating fingers 133 and 134 are directly below this. At the left of Figure 10 is seen the operating teat for finger 132. The teat for finger 131 is directly below this. The cam members on cam shaft 173 for operating the operating fingers 131, 132, 133, 134, and 135 I have designated 181, 182, 183, 184, and 185. The direction of rotation of the cam shaft 173 in going from low gear to high gear is indicated by the arrow in Figure 10.

Referring again to Figure 3 bearing against the collar 162 which carries the gear 143 is a compression spring 186, which bears against a collar 187 that is mounted on the propeller shaft 107. The collar 187 is provided with a groove 188 into which fits clutch fingers 189, (see Figure 7) carried by a yoke 190, which is pivoted at 191 (see Figure 3) on a support 192 formed on or attached to the interior transmission casing 4. Yoke 190 may be integrally formed with a segment 193 which carries worm gear teeth 194, that are adapted to engage with the worm 84 on member 83.

By rotating the hand wheel 77 on the dashboard of the car, Bowden wire 78 may be rotated to rotate the worm 84 and this, through contact with the worm teeth 194 on the segment 191, causes the collar 187 to be shifted along the propeller shaft 107 to vary the tension of the compression spring 186 as desired, to thus resist to the desired degree the action of the governor under the centrifugal forces generated in whirling the balls. As the governor is moved under increasing velocity it will cause the collar 142 to travel to the left in Figure 3, against the pressure of spring 186. This will rotate, through segment 166 and pinion 171, the cam shaft 173 in the direction of the arrows.

Depending upon the increased speed of the governor, the cam shaft fingers 131 and 132 will selectively, and successively, shift to the left with the parts in the position shown in Figure 3 to successively engage clutch members 101 and 102 with the clutch face 93. Thereafter as the speed increases and the governor revolves faster cams 183, 184, and 185 will come into contact with the teats 175 on cam fingers 133 and 134 and 135 to shift those fingers to the right, looking at the parts in position in Figure 3, to successively, and progressively, engage clutch members 103, 104, and 105 with the clutch facing 95 on the interior of the flywheel.

When the governor is at top speed, high gear is in play, that is to say rotation of the drive shaft is being imparted through the flywheel to clutch member 105, to hollow shaft 115, to gear 125, to gear 130, which rotates the propeller shaft 107 at high speed. When the propeller shaft is traveling at high speed balls 159 are swung outwardly to their maximum and travel against an annular friction member 195 which is held in place by an annular holding member 196 which rests in a groove formed in the interior of the governor casing 6.

The annular friction member 195 also rests within a groove formed in the interior of the governor casing 6. Since the outward movement of the balls 159 is thus limited, the cam 185 will rest against teat 175 on cam finger 135, and the device will be automatically kept in high gear, while the drive shaft is traveling at high speed.

When the speed of the drive shaft and hence the propeller shaft fails, such as when the engine is laboring on climbing hills, or in similar circumstances, the governor balls will leave their maximum position of outward extension and, under the pressure of the governor spring 186 will tend to approach more nearly the propeller shaft 107 which permits the collar 162 to move on the propeller shaft to the right, with the parts in the position shown in Figure 3, and through the same train of mechanism the gears are shifted downward as the speed falls until at the lowest operating speed of the drive shaft the lowest gear ratio is in action.

The operation of the plunger 62, for locking the mechanism in any desired gear ratio, to reciprocate the head 71 of the plunger has been described. The rotary member 172 (see Figure 6) is provided with apertures 200, one for each of the gear combinations above described. By pressing in the plunger 62 the transmission may be locked in any gear ratio which may be desirable under certain driving conditions.

It is advisable to keep a certain gear ratio in operation until the shift is made to another. In other words, there must not be a long hiatus between shifting from one gear ratio automatically to the next higher or lower gear ratio. To accomplish this I have provided (see Figure 6) in the extension 69 of the casing 4 an aperture 201 in which a ball 202 is adapted to reciprocate. There is a compression spring 203 in the aperture which presses the ball 202 outwardly. The ball 202 rides on the surface of the rotary member 172 of the cam shaft 173. The rotary member is provided with round depressions in which the ball 202 may be nested, (see Figure 7) corresponding in position to the depressions 200. This spring pressed ball 202 tends to yieldingly hold the transmission in any one gear ratio, but does not prevent the automatic control mechanism through the instrumentality of the governor from shifting to another gear ratio. The function of the ball 202 is to hold a given gear ratio until the pressure built up is sufficient to quickly shift to another gear ratio, at which point the ball 202 will nest in another of the round apertures in the rotary members 172.

I will now describe the sub low and reverse mechanism. The sub low and reverse mechanisms are thrown into action through rotation of the shaft 36, which is controlled as before set forth by the sub low and reverse shift button 42' on the dash.

As previously explained, with the shaft 36 in the position shown in Figure 3, the teat 151 on member 149 is directly opposite the automatic teat 154 of the cam 152 which is adapted to turn with the shaft 36. In this position through the operation of the governor automatic shifting may be accomplished. In this position there is no contact between a gear 204, which is adapted for reciprocating movement on and is splined to hollow shaft 145, and a big sub low gear 206 which is keyed to the propeller shaft 107. Let us assume, however, that the shift button 42' is moved to rock the shaft 36 in a counter-clockwise manner, looking at the parts in the position in which they are shown in Figure 3. Keyed to the shaft 25 36 are operating arms 207 which carry clutch fingers 208 that engage in an annular groove 209 in a collar 211, which may be integrally formed with the gear 204 (see also Figure 12). By rotating the shaft 36 counter-clockwise, looking at the parts in the position shown in Figure 3, the sub-low teat 155 of the cam 152 will contact the teat 151 of the member 149. This throws clutch member 106 into clutch face 93 on the interior of the flywheel. Because of the rotation of the shaft 36 and of the train of connections just described between it and the gear 204, the gear 204 is thrown into mesh with the sub low gear 206. When this takes place, the car can be driven in sub low, will stay in sub low, and is not subject to the action of the automatic gear shifting mechanism as long as the shaft 36 is kept in the just described angular position. To use the sub low, the clutch pedal 16 should be depressed to release the action of the automatic mechanism, a function which has not yet been described, but which will be described. When the clutch pedal 16 is depressed, the clutch members 101 to 105, inclusive, are no longer under control of the governor, as will be later explained. In the same manner when the reverse gear is thrown into function, which will now be described, it is necessary to release the transmission from the automatic operation by depressing clutch pedal 16.

Let us assume now that the operator desires to throw the transmission into reverse. Button 42' is manipulated to rock the shaft 36 in a clockwise movement, looking at the parts in the position in Figure 3, so that the reverse teat 153 contacts with teat 151 of the member 152. Here the clutch member 106 is in engagement with the clutch face 93 of the flywheel. The gear 204 has been shifted to the right, looking at the parts from the position shown in Figure 3, so that the gear 204 meshes with a reverse idler gear 212 (see Figure 12) which, through a collar 213 rotates a reverse gear 214. The collar 213, the reverse idler gear 212, and reverse gear 214 are supported on a stub shaft 215 mounted on supports 216 formed on the wall of the casing 4. The reverse gear 214 is in mesh with the big sub low gear 206, but, of course, rotates this gear in reverse direction from that in which it is rotated when it is in mesh with the small sub low gear 204. This gives the reverse motion of the car.

By shifting quickly from sub low to reverse, the car may be rocked when it is embedded in sand or bog to release it from its embedded position. This is of some considerable utility in certain emergencies.

When the brake pedal 15 is pushed downwardly when the transmission is in automatic operation, in other words, with teat 154 positioned as shown in Figure 3, the lost motion linkage indicated at 61 in Figure 2 is so constructed that the shaft 36 will be rocked sufficiently in a counter-clockwise direction, looking at the parts from the position of Figure 3, that teat 151 will no longer be in contact with teat 154, but teat 151 will occupy a position between governor teat 154 and sub low teat 155. In this position hollow shaft 145 will not be pressed to the left to cause clutching engagement between clutch member 106 and clutch face 93, and the automatic operation of the transmission will no longer function. This is of some considerable advantage in properly braking the vehicle.

I have spoken of throwing the automatic operation of the transmission out of function when the sub low gear or the reverse gear is in operation. I do this by releasing the cam shaft 173 at its top to permit it to freely move, so that the cams 181 to 185 will not bear with sufficient force on the teats 175 of the cam fingers 131 to 135, inclusive, to shift the cam fingers laterally to throw into operative engagement the clutch members 101 to 105, inclusive, with the clutch faces on the interior of the flywheel. The mounting of the cam shaft 173 is such as to permit considerable play at its upper end without harm to the mechanism.

The bell crank lever 25 (see Figure 6) can be rocked on its pivot 26 to pull on the rod 31 to reciprocate bolts 35. The bolts 35 (see Figure 8) carry wedge-like cam members 217. The bolts 35 pass through apertures formed in a compartment 218 formed on the transmission casing 4. Contacting the wedge-like cam members 217 are similar cam members 219 attached to the walls of the compartment (see Figure 8). Bearing against the faces of the wedge members 217 are plate members 221. Against the plate members 221 are bowed compression springs 222 which are bolted at 223 to a journal block 224 in which the cam shaft 173 is journaled.

Let us assume that the clutch pedal is moved to reciprocate the bolts 35 inwardly. Wedge member 217 will slide along the complemental wedge members 219 to move inwardly the plates 221 against the tension of the springs 222 to hold the journal block 224 firmly centered in place so that the cams 181 to 185, inclusive, will function in shifting the cam fingers 131 to 135, inclusive, through contact of the cams with the teats 175 on the cam fingers. The position of the parts in which the bolts 35 are reciprocated inwardly to such a position as is shown in Figure 1, is one in which the clutch pedal 16 has not been depressed. In this position the spring 19 holds the clutch pedal upwardly, and the journal block 224 for the upper end of the cam shaft 173 is held firmly in position so that the automatic operation of the transmission can function.

Now let us assume that the operator pushes down on clutch pedal 16 so that the bolts 35 are reciprocated outwardly. This causes the wedge members 217 to slide by the wedge members 219 to relieve the tension on the springs 223 to permit the journal block 224 to be loose, and hence the upper end of the cam shaft 173 can play loosely within certain limits. The apertures through which bolts 35 pass permit some lateral play of the bolts 35. The bolts 35 are also somewhat loosely mounted in the member 34 which permits movement of the wedge members 217 toward and away from each other during reciprocation of the bolts 35, to permit the above indicated function.

It will be noted that the propeller shaft, because it occupies a position below the crank shaft, permits in the ordinary automotive structure a more direct line than is usual from the propeller shaft through the universal joint to the differential. This tends to relieve the strain on the spring and on the universal joint, and to increase their life and efficiency, while also giving a smoother and more even drive through the universal joint.

The compact construction of the gear box causes saving of space. Grease or dirt cannot have access to the clutch mechanism, or dirt to the gear mechanism. The device permits development of full horse power of the engine in low gear, and also obviates the necessity of speeding the engine to the vibration point in order to obtain greater speed, for the load is equalized through different gears of different ratios that are always in mesh. Moreover, speed of the vehicle being operated may be increased without the necessity of materially increasing the revolutions of the motor. This latter feature tends to eliminate danger from overheating of the motor, and materially reduces consumption of fuel and oil.

The clutches are constructed in a very compact manner, yet there is sufficient spring tension from center to rim of each clutch to insure smooth and even pull under operating conditions. The shaft assembly with the nested shafts and the fittings provide easy means of lubrication of the shafts.

Since the hollow shafts all rotate in the same direction there is a relatively small variation in speed between adjacent shafts. This tends to reduce friction and wear, because of the relatively small velocity of rotation change between adjacent gear shafts. The clutch linings have a long life since the clutch discs are turning at approximately the speed wanted when the shift from one disc to another is made.

The governor construction in which the strain is taken off the operating parts when the governor is operating at maximum speed, saves undue wear on the control mechanism. By moving the button control near the driver's seat both back and forth, the manually operated gear can be shifted from low to reverse, and from reverse to low, and in this manner the car can be rocked to get out of sand and bog, where such movements are needed.

It will be noted that the gearing can be so designed that there may be any desirable number of shifts, and the high gears can be made with a very high ratio to give an overdrive at high speeds that will conserve much fuel at such rates of travel, as well as saving wear on moving parts.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a variable speed transmission, a source of power, a flywheel rotated by said source, opposed clutching areas on the flywheel, a plurality of clutching means adapted to clutch each clutching area, driven members operatively connected to each of the clutching means, and means to select which clutching means shall engage the clutching areas.

2. In a variable speed transmission, a source of power, a rotating annular clutching member driven by said source and having a plurality of opposed clutching faces, a plurality of radially spaced clutching means differentially reciprocal in the direction of extension of the axis of rotation of the member, and selective means to move one of said clutching means into contact with the clutching face.

3. In a variable speed transmission, a source of power, a rotating annular clutching member driven by said source and having a plurality of opposed clutching faces, clutching means of which a plurality are radially spaced and adapted to engage one clutching face by movement in one direction and a plurality of which are radially spaced and adapted to engage the other clutching face by movement in the other direction.

4. In a variable speed transmission, a source of power, a flywheel having two clutching surfaces driven by said source, a plurality of clutching means movable in one direction parallel to the axis of rotation of the flywheel to engage one of the clutching surfaces, and a plurality of clutching means movable in an opposite direction along the same axis to engage the other clutching surface, and means to selectively control the movement of the clutching means.

5. In an automatic transmission, a drive shaft, mounted on the drive shaft a flywheel having opposed clutching areas, a propeller shaft below the crank shaft, a plurality of clutch means adapted to engage each of the clutching areas of the flywheel, gears on the clutch means, gears on the propeller shaft constantly engaging the first named gears, and means to automatically select the proper means to clutch a portion of the clutching area to insure proper gear ratio.

6. In an automatic variable speed transmission, a source of power, a rotating annular clutching member driven by said source, a plurality of clutching means adapted to clutch said member, driven members operatively connected to each of the clutching means, means acting directly on the driven members to selectively move the clutching means into engagement with the clutching member, and a speed controlled governor controlling the last named means.

7. In an automatic variable speed transmission, a source of power, a flywheel rotated by said source, clutching areas on the flywheel, a plurality of clutching means adapted to clutch with the clutching areas, driven members operatively connected to each of the clutching means, a governor to determine which clutching means shall engage the clutching areas, and means controlling the setting of the governor.

8. In an automatic variable speed transmission, a source of power, a rotating annular clutching member driven by said source, a plurality of clutching means differentially movable to engage such member, and a governor to selectively control the movement of a clutching means, and means to regulate the governor from a remote point.

9. In an automatic variable speed transmission, a source of power, a rotating annular clutching member driven by said source, a plurality of clutching means at least one of which is movable in one direction to engage the member and at least one of which is movable in the opposite direction to engage the member, cam means to selectively control the movement of the clutching means, and a governor to control the movement of the cam.

10. In an automatic variable speed transmission, a source of power, a clutching member operatively connected to the source, nested clutching means, cam means to selectively engage one of the clutching means with the clutching member, and a speed controlled governor adapted to actuate the cam means.

11. In a variable speed transmission, a source of power, a clutching member having a plurality of opposed clutching faces, a plurality of clutching means, tubular nested connecting shafts each connected to a clutching means, gearing connected to the clutching shaft, a cam operating on the shafts to selectively clutch one of the clutching means and the member, and a speed controlled governor adapted to actuate the cam.

12. In a variable speed transmission, a source of power, a clutching member, a plurality of nested clutching means, a plurality of tubular nested connecting shafts each connected to a clutching means, gearing connected to the connecting shafts, a multifaced cam operating on the shafts to selectively clutch any one of the clutching means to the member, and a speed controlled governor adapted to actuate the cam.

13. In an automatic variable speed transmission, a source of power, a clutching member, a plurality of nested clutching means, a plurality of tubular nested connecting shafts each connected to a clutching means, gearing connected to the connecting shafts, means to reciprocate a selected connecting shaft to selectively clutch one of the clutching means and the member, and a speed controlled governor to move said means to effect the selection.

14. In an automatic variable speed transmission, a source of power, a rotating annular clutching member driven by said source, a plurality of clutching means adapted to clutch different areas of said member, each of said clutching means being connected to a gear which is in constant mesh with a gear upon a driven member, cam means to selectively engage one of said clutching means with the clutch member, said cam means being operable by a speed control governor.

15. In an automatic variable speed transmission, a source of power, a rotating annular clutching member driven by said source, a speed controlled governor, a plurality of clutching means adapted to clutch different areas of said member, each of said clutching means being geared to a propeller shaft, cam means to selectively engage one of the clutching means with the clutch member and automatically operated by the speed controlled governor, and means to manually engage a clutching means and the clutch member.

16. In a variable speed transmission, a source of power, a clutching member driven by said source, a plurality of clutching means adapted to be selectively and automatically engaged with the clutching member, a speed controlled governor for effecting such selection and engagement, and means for locking any one of said clutching means in engagement with the clutching member.

17. In a variable speed transmission, a source of power, a clutching member driven by said power source, a plurality of gears adapted to be selectively driven by the clutching member, a speed controlled governor slidable longitudinally on the drive shaft, a cam shaft actuated by the longitudinal displacement of the governor on the drive shaft, a plurality of cams mounted on the cam shaft, and a finger for each gear adapted to be engaged by one of the cams to cause said gear to be driven by the clutching member.

18. In a variable speed transmission, a source of power, a clutching member driven by said power source, a plurality of gears adapted to be selectively driven by the clutching member, a speed controlled governor splined longitudinally on the drive shaft, and adapted to be longitudinally displaced according to the speed of the drive shaft, a cam shaft actuated by the longitudinal displacement of the governor on the drive shaft and extending through a plurality of nested fingers, each of said fingers adapted to engage one of the gears to cause the gears to be driven by the clutching member, and a plurality of cams on the cam shaft, each cam adapted to engage a finger.

19. In a variable speed transmission, a source of power, a clutching member driven by the power source, a plurality of clutching means adapted to be selectively engaged by the clutching member, cam means for effecting such selection, said cam means being mounted upon a cam shaft, a bearing for the cam shaft adjacent the cam means, and means for relieving the bearing of support to thereby render the cam means ineffective.

GEORGE O. JONES.